Jan. 9, 1940.   S. B. ROBERTS   2,186,125
DUST ELIMINATION
Filed Nov. 13, 1937
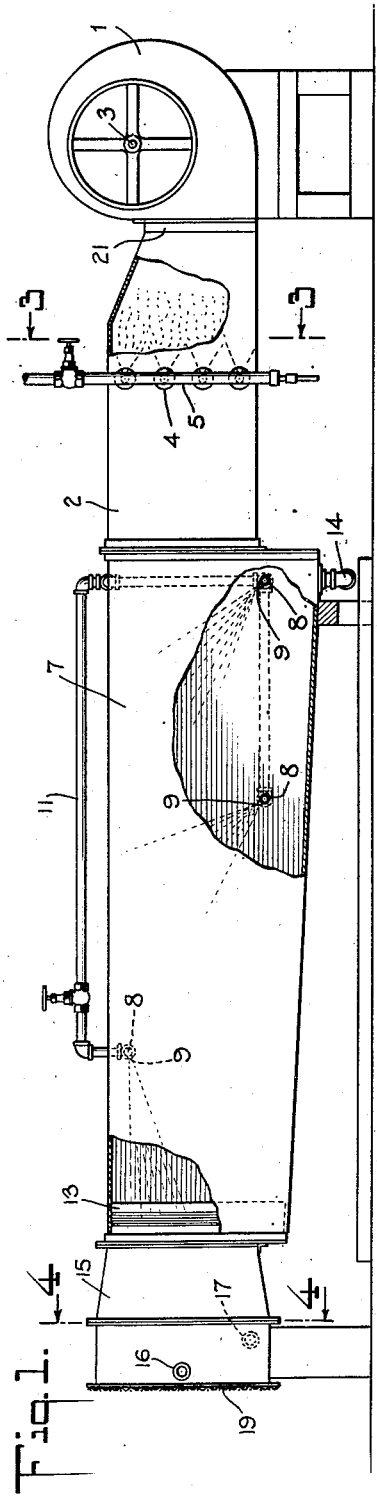
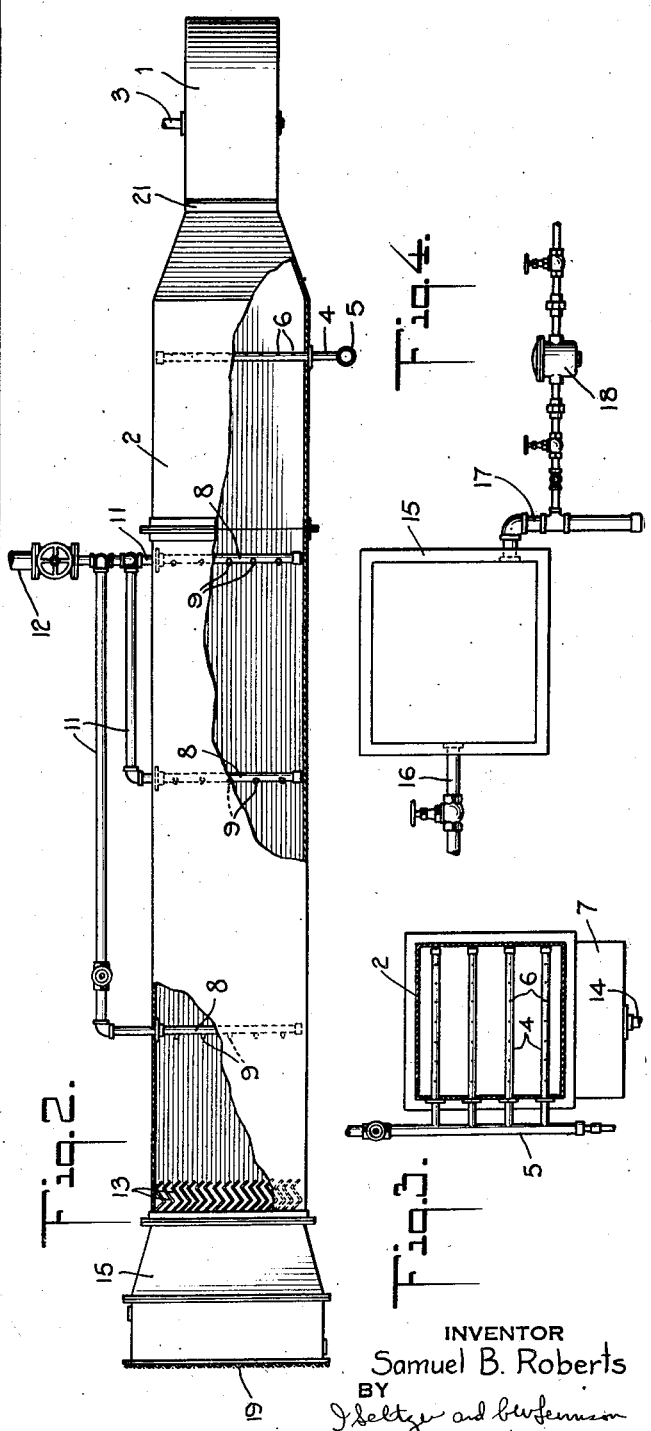
INVENTOR
Samuel B. Roberts
BY
ATTORNEYS Patented Jan. 9, 1940

2,186,125

UNITED STATES PATENT OFFICE 2,186,125

DUST ELIMINATION

Samuel B. Roberts, Cumberland, Md., assignor to Celanese Corporation of America, a corporation of Delaware Application November 13, 1937, Serial No. 174,290

1 Claim. (Cl. 183—22)

This invention relates to a method of and means for eliminating dust and conditioning the air in an enclosed space such as a room, treating chamber, etc.

An object of the invention is the economic and expeditious method of cleaning air or other gas. Another object of the invention is the provision of a device which cleans and conditions air, and in the cleaning operation removes from the air dust particles that ordinarily pass through air scrubbers and washers employed prior to this invention. Other objects of this invention will appear from the following detailed description and drawing.

In the drawing, wherein like reference numerals refer to the same or similar elements in their respective views:

Fig. 1 is a side view, partly broken away to show the interior thereof, of the device for cleaning and conditioning air in accordance with my invention, Fig. 2 is a plan view, partly broken away, of the device, Fig. 3 is a sectional view taken on the line 3—3 of Fig. 1, and Fig. 4 is a sectional view taken on line 4—4 of Fig. 1.

Many methods of cleaning and conditioning air are known in which the air is scrubbed or washed with water by passing the air through bubble towers, or modifications of the same, and also through curtains of sprayed water. These are fairly efficient and remove most of the dust but they do not remove all of it. Many minute particles of dust, especially oily bodies, are water repellent and these are blown through the beds or screens of water. Other types of dust particles are so minute that they pass through the beds or screens of water completely surrounded by air even when the air is well divided in passing through the water.

I have now found that all the dust particles whether water repellent or of the smallest particle size may be removed from air by employing the dust particles as a nucleus upon which fog or water vapor is caused to condense and then either precipitating the fog or washing the fog from the air. Although the particle size of the dust is very small and often water repellent it is easily removed when encased by a relatively large body of water, that has been caused to condense upon the dust particles.

In accordance with this invention, I clean and condition air, or similar gas, by mixing the air with water vapor, then changing the water vapor to a fog in which action the water vapor employs the dust particles of the air as a nucleus upon which to condense and then precipitate or wash the fog from the air. After cleaning the air the moisture content thereof can be raised to the desired degree by the addition of water vapor thereto. Also, in accordance with this invention, I construct a device for effecting the cleaning the air of dust and conditioning the air according to the above stated method. By "dust" is meant both solid and liquid particles carried by air.

In certain industries, such as in the production of film for photographic and similar work, it is necessary that the air in the film casting room be absolutely free from dust. For this purpose air, passed through dry filters of glass wool, cotton fabrics, etc., or through water towers and sprays or combinations of these, has been found to be not clean enough. Another instance where absolutely clean air is required is in the crepe twisting of yarns containing an organic derivative of cellulose. These yarns are twisted to 50 or more turns per inch, thus travelling linearly at a very slow speed. These yarns develop a static electric charge which attracts dust particles from the air. This produces a dirty yarn, and attempts to remove the dirt therefrom destroys the creping property of the plastic yarn. These, of course, are but two instances, the invention, however, being not limited thereto as the method and device may be employed wherever clean conditioned air is desired.

The following description of the device illustrates the method of this invention. The device shown in the drawing comprises generally a propeller 1 adapted to force or draw if installed downstream a current of air through the first section 2 of a conduit. The propeller 1 may be a centrifugal pump, a fan or other type of pump adapted to create a current of air. The propeller is supported on any suitable type of support and may be driven by any suitable source of power such as by means of the shaft 3.

As the current of air leaves the propeller 1 it is forced into the section 2 of the conduit which may be of any desired shape such as rectangular, square, round or other shape. In this section of the device there is provided a plurality of pipes 4 connected to a common header 5 located at the side of the conduit. The pipes 4 are provided with a plurality of nozzles 6. Steam is supplied to the header 5 and is blown through the pipes 4 and nozzles 6 into the first section 2 of the conduit, thus introducing into the air stream any desired quantity of water vapor up to or exceeding the saturation point of the air passing through this conduit.

After the air leaves the first section 2 it is passed into a second section 7 of the conduit in which there is provided means for cooling the air in such a manner that the mixture of air and water vapor produced in the section 2 condenses into a fog, the water collecting around each minute particle of dust in the air. By the term "condense" is meant that the molecules of water coalesce around the particles of dust as distinguished from the production of rain which is termed "precipitation".

The means for creating the fog is shown on the drawing as a plurality of sprays of water indicated by the diverging broken lines. To produce these sprays of water there are provided a plurality of pipes 8 equipped with nozzles 9. Water is supplied to the pipes 8 and nozzles 9 through connecting pipes 11 fed from any suitable source of water supply through pipe 12. The water may be cooled by artificial means or may be cooled by cold water drawn, for example, from deep wells. In place of the sprays of water the section 7 may be provided with cooling coils in which cold brine or water is circulated. In this instance the mixture of air and water vapor coming in contact with the cold coils produces a fog and then the fog gathers together and is precipitated as droplets of water. Other ways may be provided for removing the fog from the air. I have found that very efficient results are obtained when the fog is washed from the air by means of sprays of water as shown in the drawing. It is preferable to have the water spray in the direction of travel of the current of air rather than against the current of air. In this instance the sprays of cold water first cool the air to form a fog and then the water from the spray washes the fog from the air.

At the end of the conduit section 7 are a plurality of baffle plates 13. These baffle plates are so bent that the air is forced to travel therethrough in a devious path causing all of the air passing therethrough to contact with the plates. Where water sprays are employed a spray of water is directed against these plates to keep the same cold and to flush any collected moisture off the same. Where a cooling coil is employed instead of water sprays a cooling coil may be connected with the baffle plates 13 such that they will condense substantially all the water from the air. In section 7 of the conduit the dust particles are carried to the bottom with the water of the condensed fog and the water employed to wash the fog from the air. The water and dust are removed by means of a suitable drain 14.

After the air has been cleaned of dust in accordance with the invention, the air is passed through the baffles 13 to a section 15 of the conduit. This section of the conduit comprises an air conditioner for adjusting the relative humidity and temperature of the air to that desired. In this section 15 of the conduit is a steam pipe 16 and a draining outlet 17 having a condensate trap 18. By regulating the amount of steam entering the section 15 through the pipe 16 the air can be given any desired temperature and humidity. The end of the conduit section 15 may be provided with a wire or other fabric screen 19.

The device as shown in the drawing and the method described above removes substantially all of the dust particles from the air.

If it also is desired to remove odors from the air a filter of glass wool which is continually flushed with tricresyl phosphate or other aryl phosphate may be inserted in the conduit at 21.

It is to be understood that the foregoing detailed description is merely given by way of illustration and that many variations may be made therein without departing from the spirit of my invention.

Having described my invention, what I desire to secure by Letters Patent is:

A device for cleaning air of dust comprising a conduit composed of a plurality of sections, means for forcing air into said conduit, means in one section of said conduit for supplying water vapor to the air, a plurality of spaced sprays of cold water in a second section of said conduit directed substantially in the direction of travel of the air and adapted to cause the water vapor to be precipitated on the dust particles in the form of fog and the fog to be washed from the air, baffle plates in one end of said second section for removing moisture from the air leaving said second section, one of said sprays being directed on to said baffle plates for cooling and cleaning the same, and means in a third section of said conduit for adding steam to the air to regulate the moisture content thereof.

SAMUEL B. ROBERTS.